United States Patent [19]

Cherng

[11] Patent Number: 5,516,600
[45] Date of Patent: May 14, 1996

[54] TEMPERATURE-SENSITIVE THERMAL INSULATORS FOR LEAD-ACID BATTERIES

[75] Inventor: Jing-Yih Cherng, Eagan, Minn.

[73] Assignee: GNB Battery Technologies Inc., Mendota Heights, Minn.

[21] Appl. No.: 187,215

[22] Filed: Jan. 26, 1994

[51] Int. Cl.⁶ .................................. H01M 10/50
[52] U.S. Cl. .................... 429/62; 429/120; 429/225
[58] Field of Search .................. 429/62, 120, 26; 165/46, 81, 83, 104.21, 911; 383/113, 901

[56] References Cited

U.S. PATENT DOCUMENTS

| | | | |
|---|---|---|---|
| 1,266,780 | 5/1918 | Edison . | |
| 2,410,952 | 11/1946 | Lighton | 136/161 |
| 2,707,721 | 5/1955 | Anderson et al. | 136/166 |
| 2,717,045 | 9/1955 | Nallinger | 180/1 |
| 2,855,453 | 10/1958 | Eidensohn | 136/161 |
| 3,110,633 | 11/1963 | Bachmann | 136/161 |
| 3,408,234 | 10/1968 | Ririe, Jr. | 136/181 |
| 3,527,925 | 9/1970 | Toyooka et al. | 219/521 |
| 3,745,048 | 7/1973 | Dinkler et al. | 136/166 |
| 3,767,468 | 10/1973 | Schusler | 136/166 |
| 3,834,945 | 9/1974 | Jensen | 136/161 |
| 3,844,339 | 10/1974 | Kranz | 165/46 |
| 4,007,315 | 2/1977 | Brinkmann et al. | 429/62 |
| 4,054,730 | 10/1977 | Crifasi | 429/120 |
| 4,107,402 | 8/1978 | Dougherty et al. | 429/120 |
| 4,126,734 | 11/1978 | Walters | 429/71 |
| 4,255,502 | 3/1981 | Taylor, III | 429/163 |
| 4,314,008 | 2/1982 | Blake | 429/120 X |
| 4,383,013 | 5/1983 | Bindin et al. | 429/120 X |
| 4,522,898 | 6/1985 | Esrom | 429/120 |
| 4,572,878 | 2/1986 | Daugherty | 429/62 |
| 4,600,665 | 7/1986 | Sanders | 429/120 |
| 4,738,906 | 4/1988 | Sanders | 429/120 |
| 4,830,937 | 5/1989 | Clerici | 429/120 |
| 4,840,855 | 6/1989 | Foti et al. | 429/120 |
| 4,842,050 | 6/1989 | Harper | 429/26 X |
| 4,865,928 | 9/1989 | Richter | 429/120 |
| 4,873,159 | 10/1989 | Ciriello | 429/120 |
| 4,976,327 | 12/1990 | Abujudom, II et al. | 180/68.2 |
| 5,015,545 | 5/1991 | Brooks | 429/99 |
| 5,039,927 | 8/1991 | Centafanti | 320/2 |
| 5,082,075 | 1/1992 | Karolek | 180/68.2 |
| 5,091,272 | 2/1992 | Treger | 429/62 |
| 5,141,826 | 8/1992 | Bohm et al. | 429/120 |
| 5,165,127 | 11/1992 | Nicholson | 165/46 X |
| 5,212,025 | 5/1993 | Shibata et al. | 429/120 |
| 5,215,834 | 6/1993 | Reher et al. | 429/62 |
| 5,324,320 | 6/1994 | Augustine et al. | 165/46 X |
| 5,377,495 | 1/1995 | Daigle | 165/46 X |
| 5,392,847 | 2/1995 | Stephenson | 165/46 |

*Primary Examiner*—Anthony Skapars
*Attorney, Agent, or Firm*—Leydig, Voit & Mayer, Ltd.

[57] ABSTRACT

Temperature-sensitive thermal insulators for batteries are provided for. The thermal insulators are fabricated from barrier film and have one or more expandable chambers containing a fluid. The fluid has a vaporization temperature of from about 90° F. to about 200° F., preferably from about 100° F. to about 130° F. The insulator has a first volume above the fluid vaporization temperature which is greater than a second volume of the insulator below the fluid vaporization temperature.

11 Claims, 2 Drawing Sheets

5,516,600

TEMPERATURE-SENSITIVE THERMAL INSULATORS FOR LEAD-ACID BATTERIES

FIELD OF THE INVENTION

This invention relates to thermal insulators for batteries and, more particularly, to thermal insulators for batteries which have temperature dependent thermal conductivity.

DESCRIPTION OF THE PRIOR ART

Lead-acid, starting, lighting, and ignition (SLI) electric storage batteries are used in a wide range of vehicles under often extreme temperatures. For example, SLI batteries mounted in the engine compartments of automobiles may be exposed to temperatures as high as 230° F., and to exacerbate the situation, the batteries in some vehicles are situated in the path of hot air currents flowing through the engine compartment. Indeed, it has been observed that, in general, changes in automobile design have caused a substantial increase in normal under-the-hood temperatures.

Such high temperatures can diminish battery performance and service life in various ways. For example, positive battery grids suffer increased corrosion and deterioration at higher temperatures. Batteries also lose greater amounts of water at higher temperatures. Such problems, especially grid corrosion, are particularly vexing in batteries which are intended to be maintenance free.

Accordingly, various types of heat shields have been devised for lead-acid, SLI batteries. One type of heat shield uses insulating materials, such as fiberglass and polystyrene and polyurethane foams, which are wrapped or otherwise disposed around the battery container. For example, U.S. Pat. No. 2,707,721 to W. Anderson et al. discloses a jacket fabricated from a composite material incorporating fiberglass. Another approach effectively creates a double-walled battery container having a sealed insulating air space between the walls, such as is disclosed in U.S. Pat. No. 5,212,025 to O. Shibata et al. Other heat shields function primarily by deflecting hot air currents away from a battery.

While such heat barriers are effective to varying degrees in protecting batteries against higher temperatures, there are times during operation of a vehicle when heat transfer to a battery is desirable. When a vehicle is operated at relatively low temperatures, for example, heat from the vehicle can raise the battery to more favorable operating temperatures. Conventional heat shields, however, slow down this warming process and, in general, are passive. That is, conventional heat shields are not responsive to the thermal demands of the battery and conduct heat at the same rate, or deflect hot air to the same degree regardless of whether it may be desirable for the battery to absorb heat.

Various systems have been proposed which can both cool and heat batteries. One type of system proposed includes a slightly oversized battery housing. Hot or cold air is selectively circulated through an air space between the battery and housing. Such active systems are disclosed, for example, in U.S. Pat. No. 5,215,834 to M. Reher et al. and U.S. Pat. No. 4,840,855 to M. Foti et al. "Active" systems of that type, however, are relatively complicated and must be connected to a source of hot and cold air. They also require some means, such as fans, sensors, controls, valves, conduits and the like, to circulate the right air at the right time. The cost and complexity of such systems heretofore has precluded their widespread use.

An object of the subject invention, therefore, is to provide thermal insulators for a battery which effectively protect batteries against higher ambient temperatures, but which also allow more rapid warming of a battery at lower ambient temperatures.

Another object of the subject invention is to provide a thermal insulator for batteries which is responsive to the heat demands of a battery, but which is manufactured and installed more easily and economically than previously proposed active systems.

A further object is to provide a thermal insulator which may be used to cover all or a portion of a battery surface and, when so disposed, has a higher thermal conductivity at lower temperatures and lower thermal conductivity at higher temperatures.

It is also an object of the subject invention to provide thermal insulators which can be used to fabricate air deflectors which deflect hot air only at higher temperatures.

Yet another object of the subject invention is to provide thermal insulators wherein all of the abovementioned advantages are realized, and to provide batteries which utilize those thermal insulators.

Those and other objects and advantages of the invention will be apparent to those skilled in the art upon reading the following description and upon reference to the drawings.

SUMMARY OF THE INVENTION

The subject invention provides for temperature-sensitive thermal insulators for batteries. The thermal insulators are fabricated from barrier film and have one or more expandable chambers containing a fluid. The fluid has a vaporization temperature of from about 90° F. to about 200° F., preferably from about 100° F. to about 130° F. The insulator has a first volume above the fluid vaporization temperature which is greater than a second volume of the insulator below the fluid vaporization temperature.

The thermal insulators may be fabricated as a blanket, wherein the blanket has a first thickness above the fluid vaporization temperature which is greater than a second thickness below the fluid vaporization temperature. The novel thermal insulators also may be fabricated as bellows having a first length above the fluid vaporization temperature which is greater than a second length below the fluid vaporization temperature.

As will become apparent from the discussion which follows, the thermal insulators of the subject invention, in contrast to passive insulators, are responsive to the heat demands of a battery. At temperatures below the fluid vaporization temperature, they provide little or no insulation of the battery. The battery, therefore, is able to absorb heat and warm to more favorable operating temperatures. At temperatures above the fluid vaporization temperature, however, the novel thermal insulators provide effective insulation and can protect batteries from excessively high ambient temperatures. When ambient temperatures cool to below the fluid vaporization temperature, the insulators once again provide little or no insulation and, thus, allow more rapid cooling of the battery.

DETAILED DESCRIPTION OF THE INVENTION

The thermal insulators of the subject invention are temperature-sensitive, that is, the thermal conductivity of the novel thermal insulators is dependent on their temperature. More specifically, they have higher thermal conductivity at lower temperatures and lower thermal conductivity at higher temperatures.

To that end, the novel thermal insulators are fabricated from barrier film and have one or more chambers. The chambers contain fluid and are expandable so that the chambers, and thus the thermal insulator, has a first volume above the vaporization temperature of the fluid which is greater than a second volume of the insulator below the vaporization temperature. Thus, as will become apparent from the discussion which follows, the novel thermal insulators will conduct heat more readily at temperatures below the fluid vaporization temperature than they will at temperatures above the fluid vaporization temperature.

Figure 1:
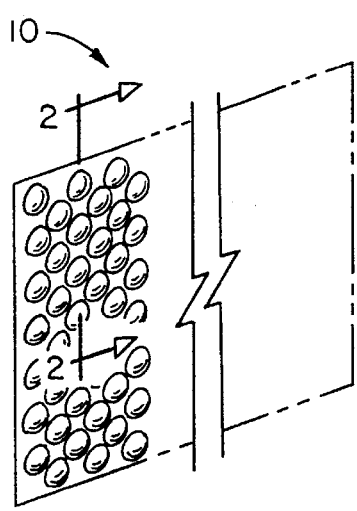
FIG. 1 is a perspective view of a thermal insulating blanket 10 of the subject invention.
Figure 2:
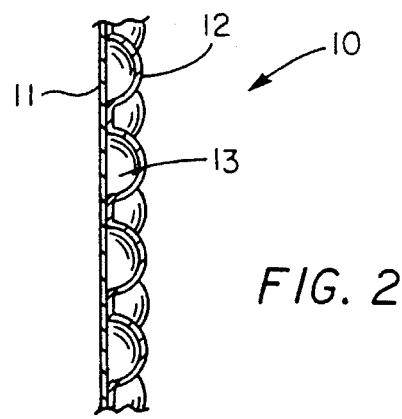
FIG. 2 is an enlarged cross-sectional view taken generally along line 2—2 of FIG. 1 of the thermal insulating blanket 10 shown in FIG. 1.

FIGS. 1 and 2 illustrate a first preferred embodiment 10 of the novel thermal insulators. The thermal insulator 10, in accordance with a preferred aspect of the invention, is fabricated as an insulating blanket from two layers 11, 12 of barrier film. The bottom layer 11 is substantially flat, the top layer 12 being quilted to the bottom layer 12 to form a plurality of bubble-like chambers 13. The chambers 13 contain a fluid (not shown).

The thermal insulator 10 is shown in FIG. 1 and 2 in its "expanded" state, i.e., at a temperature above the vaporization temperature of the fluid. At such temperatures, the fluid is a gas and will occupy substantially the entire volume of the chambers 13, and the blanket 10 will be relatively thick.

At temperatures below the vaporization temperature of the fluid, however, the chambers 13 will tend to collapse. That is, the fluid will be a liquid, in which state it occupies significantly less volume. Atmospheric pressure will tend to collapse the chambers 13 on themselves. In this collapsed state, the thermal insulating blanket 10 will be relatively thin. Thus, the thermal insulating blanket 10 has a thickness above the vaporization temperature which is greater than the thickness of the insulator below the vaporization temperature.

As the thickness of the thermal insulating blanket 10 varies, so will its thermal conductivity. At lower temperatures, below the fluid vaporization temperature when it is relatively thin, the thermal insulating blanket 10 will be a relatively poor insulator. That is, it will have a relatively high rate of thermal conductivity. On the other hand, at temperatures above the fluid vaporization temperature, the thermal insulating blanket 10 will be much thicker and will serve as a better insulator, having a thermal conductivity significantly lower than it has in its thinner state.

It will be appreciated, therefore, that the thermal insulating blanket can be used to great advantage as an insulator for lead-acid batteries. At lower temperatures, when it may be desirable for a battery to absorb ambient heat as may be generated from an automobile and to warm to more favorable operating temperatures, the novel thermal insulators have relatively high thermal conductivity. This allows more rapid warming of the battery as compared to passive insulators. On the other hand, at higher temperatures, the thermal insulators have lower thermal conductivity and can provide effective insulation against excessive heating. When the underhood air temperature becomes lower, either during driving or after parking the vehicle, the thermal insulating blanket once again will become more thermally conductive, and a hot battery will be cooled down at a faster rate.

Accordingly, the fluid used in the novel insulators may be selected from a wide variety of fluids. The fluid obviously must be chemically compatible with the barrier film from which the thermal insulator is fabricated. Preferably, the fluid is non-flammable and non-toxic so that risks associated with handling the liquid as the thermal insulator is manufactured and with accidental leakage while the thermal insulator is in service are minimized. Otherwise, the fluid may be any fluid having an appropriate normal vaporization temperature.

The appropriate normal vaporization temperatures will vary somewhat according primarily to the battery and the temperature conditions to which it will be exposed. The battery ideally should be allowed to reach its optimal operating temperature range as rapidly as possible but thereafter it should be insulated against further heat gain. Thus, the fluid generally will have a normal vaporization temperature within such optimal operating temperature range. The insulator will absorb heat first, and thus it may be desirable that the fluid have a vaporization temperature somewhat higher than the battery's optimal operating temperatures so that the thermal insulator will not expand and decrease its thermal conductivity until the battery is closer to its optimal operating temperatures. In hotter climates, where the battery usually is operated at undesirably high temperatures and, perhaps, for extended periods of time, heat gain inevitably may continue despite the best insulation. Under such conditions, it may be desirable to select a fluid with a somewhat lower vaporization temperature. The vaporization temperature also should be sufficiently low so that the thermal insulator will expand and decrease its thermal conductivity before the battery has reached temperatures high enough to significantly affect its performance.

Thus, in general, it is expected that fluids having a normal vaporization temperature of from about 90° F. to about 200° F. may be used in the novel insulators. Most preferably, the fluid will have a normal vaporization temperature from about 100° F. to about 130° F. The optimal vaporization temperature, as noted, may vary somewhat depending on the battery and the operating conditions to which it will be exposed.

Representative examples of fluids which may be used include acetone, carbon disulfide, chloroform, dichloroethylene, diethylamine, diethylether, trimethyleneglycol, trimethylstyrene, dimethylbutane, dimethylsulfide, hexane, propylene, ethylbromide, ethyl formate, ethylmercaptan, ethylpropylether, methylacetate, methylalcohol, methyliodide, methylpropionate, n-pentane, isopropyl alcohol, propylamine, propylformate, 1,1,2-trichloro-1,2,2-trifluoroethane, carbon tetrachloride, cyclohexane, 2,6-xylidine, 2,4-xylidine, 2,4-xyaldehyde, 4-vinylphenetol, 4-vinylanisole, 3-vinylanisole, 2-vinylanisole, γ-valerolacetone, iso-valeric acid, n-valeric acid, undecan-2-ol, undecane, trimethylsuccinic anhydride, trimethylethylbenzene, dichloroethane, and mixtures thereof. While each of those fluids may have various advantages relative to each other, the worker in the art will be able to select an appropriate fluid for a particular application in view of the criteria discussed herein and other well known considerations.

The amount of fluid placed within the chambers of the novel insulators will depend primarily on the size of the chambers. In general, sufficient fluid should be incorporated into the chambers such that the fluid, in its gaseous state, will occupy substantially all of the chamber at normal or only slightly elevated pressures. The amount of fluid should not be so great that the fluid, at the upper ranges of the insulator's expected operating range, will become so pressurized that the risk of leaks from the chambers is significant.

The film used to fabricate the novel thermal insulator is a barrier film, that is, it is chemically stable in the presence of the fluid and is sufficiently impermeable thereto so that fluid loss through the film is minimal or nonexistent under normal service conditions. Preferably, the barrier film is sufficiently impermeable to the fluid so that sufficient amounts of the fluid will be retained in the chambers for the expected service life of the insulator.

The elasticity and tensile strength of the barrier film also should be such that it is reasonably resistant to tears or punctures, and such that the fluid's tendency to expand above its vaporization temperature does not cause the chambers to rupture. It will be appreciated that further expansion of the chambers as gas is heated, to the extent that it does not interfere with the means used to secure the battery and the like, will further decrease the thermal conductivity of the thermal insulator.

The mechanical properties of the film also should be selected giving due consideration to the structure of the thermal insulator. For example, the chambers 13 of the insulating blanket 10 are intended to collapse. The barrier film used to fabricate such blankets, therefore, should be relatively flexible to allow the chambers to collapse in on themselves. On the other hand, as discussed in greater detail below in respect to other preferred embodiments of the subject invention, the chambers may be defined by folds in the barrier film, which folds allow the chambers to expand essentially by folding and unfolding. In such structures, the film may be, and preferably is, somewhat more rigid than films used in chambers which do not have folds and the like which allow the chambers to collapse in a predetermined fashion.

The barrier film also preferably is selected so that fabrication of the thermal insulator is facilitated. For example, the thermal insulating blankets of the subject invention preferably are fabricated from two "quilted" layers of barrier film such that the chambers are defined therebetween. While such quilting may be accomplished by any suitable method, methods such as heat sealing, solvent bonding, or with adhesives are both familiar to those skilled in the art and are easily and economically accomplished. Thus, thermoplastic barrier films, which can be heat welded together, or other polymeric films which can be joined with solvents or adhesives are preferred.

Examples of barrier films which may be used include films composed of polyolefin, rubber, polystyrene, polyester, polyvinylchloride, polyacrylonitrile, poly (vinylacetate), polyethylene terephthalate, poly (acrylonitrile styrene) polyacrylate, poly (vinylidene fluoride), polyurethane, polycarbonates, polyoxyphenylene, polybutadiene, and copolymers thereof. It will be appreciated, however, that the mechanical and barrier properties of a film also will depend on the thickness of the film as well as its composition. In general, however, suitable films are relatively thin, for example, from about 0.05 to about 4 mils. While a particular barrier film may have various advantages relative to other barrier films, the worker in the art will be able to select an appropriate film for a particular application in view of the criteria discussed herein and other well known considerations.

It also should be appreciated that the barrier film can be a composite film. Such composite barrier films may combine the advantages of films which by themselves would be undesirable or less than optimal. For example, thin metallic films, such as aluminum films, reflect heat well and are highly impermeable. The acid corrosion resistance, tensile strength and other properties of metallic films, however, generally make them less than desirable alone in the novel insulators. Metal films, however, can be laminated to other films, for example, between thermoplastic polymer films. Such a composite barrier film would have a higher tensile strength and be readily amenable to quilting, yet it still would have the advantageous reflective and barrier properties of metal films.

Similarly, although the thermal insulating blanket 10 is illustrated as having bubble-shaped chambers 13, the quilting pattern may be varied to produce any number of chambers having different shapes. To the extent possible, those portions of the barrier film layers which are actually bonded together should be minimized, so as to increase the insulating value of the insulator in its expanded state. Otherwise, however, a wide variety of quilting patterns can be used to create thermal insulating blankets of the subject invention. Likewise, although the insulator is illustrated as being formed from two layers of film, more layers can be used if desired, for example, to improve the overall permeability and mechanical properties of the insulator or to create different arrays and shapes of chambers.

Figure 3:
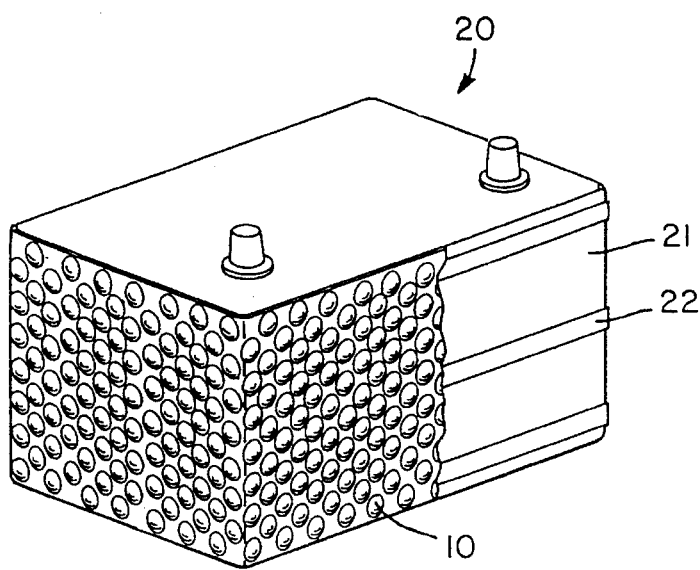
FIG. 3 is a perspective view of a battery 20 on which is secured the thermal insulating blanket 10 shown in FIG. 1, a portion of the thermal insulating blanket 10 being torn away to show details of the manner in which it is secured to the battery.

The manner in which the thermal insulators of the subject invention may be used is illustrated by reference to a typical lead-acid battery, such as that shown in FIG. 3. As shown therein, the battery 20 comprises a container 21 having a top wall, a bottom wall, and side walls. In accordance with the subject invention, the temperature-sensitive thermal insulators are mounted over at least a portion of outer surfaces of the walls of the container 21. For example, the battery 20 in FIG. 3 has thermal insulating blankets 10 mounted over the outer surfaces of the battery container side walls.

It is believed that this arrangement will be the preferred manner of using the novel thermal insulator blankets for most battery applications. Mounting thermal insulator blankets on the bottom surface or top surface of the battery may interfere with terminal connections or battery holddown devices. If such is not the case, however, the top and bottom surfaces of the battery may be insulated as well. Similarly, if in a particular application the insulator would interfere with the clearance between the battery and the engine compartment or components mounted therein, portions of a battery side wall may be left uncovered as well. Thus, the optimal coverage of a battery container with the thermal insulators may vary somewhat, but it will be apparent in a particular application to those skilled in the art.

The novel thermal insulating blankets may be secured on the battery by any suitable means. For example, bolts or sheets of insulator blankets could be sold for use in retrofit applications, i.e., to insulate batteries sold and installed separately. In such applications, strips of double-sided tape 22, as shown in FIG. 3, may be used to secure the thermal insulator to the battery container surfaces. Straps, adhesives, and the like, however, also may be used as will be apparent to those of ordinary skill in the art.

Figure 4A:
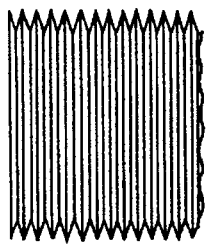
FIGS. 4A and 4B are schematic illustrations of a second preferred embodiment 30 of the subject invention, showing a thermal insulating bellows 30 in, respectively, its unfolded and folded state.
Figure 4B:
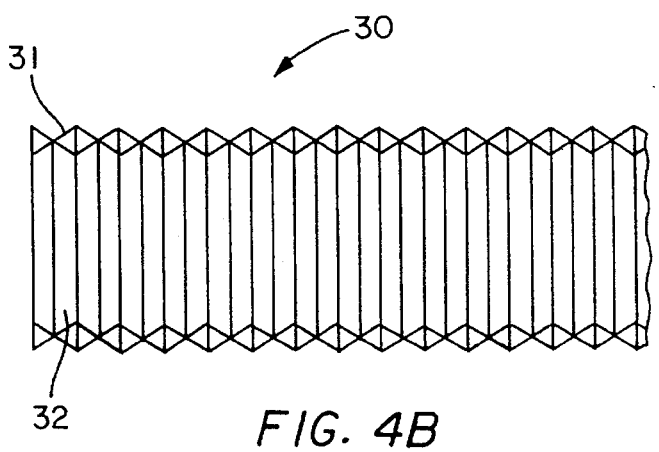

In other preferred embodiments of the subject invention, the novel thermal insulators may be fabricated in the form of bellows, such as the thermal insulator 30 which is schematically illustrated in FIGS. 4A and 4B. At temperatures below the fluid vaporization temperature, as shown in FIG. 4B, the bellows 30 will be in a folded condition. Conversely, at temperatures above the fluid vaporization temperature the bellows 30 will unfold, as shown in FIG. 4A.

In accordance with the subject invention, the bellows insulator 30 is fabricated from barrier film 31 and has one or more chambers 32 containing a fluid as described above. The bellows 30 has an elongated rectangular cross-section; and, although the precise structure is not illustrated in great detail in FIGS. 4A and 4B, it will be appreciated that barrier film can be cut, folded, and sealed together in any of the many configurations common in the manufacture of bellow-like structures. The barrier film preferably is sufficiently rigid and has thermosetting properties so that folds may be formed therein and so that the bellows will unfold and fold in a more reliable manner.

The novel thermal insulators, when fabricated in the form of bellows, may be mounted to a battery analogously to the thermal insulating blankets described above. It will be appreciated, however, that the novel thermal insulators have particular utility as temperature-sensitive hot air deflectors when fabricated as a bellows. That is, they may be mounted in the engine compartment of an automobile or other vehicle such that, in their unfolded state, they form a barrier which serves to not only thermally insulate the battery, but to physically deflect hot air currents that otherwise might impinge on the battery. At lower temperatures, when the bellows is in its folded state, however, such warm air currents will not be deflected, and can serve to warm the battery to more favorable operating temperatures.

It will be appreciated, of course, that when the bellows is used as a hot air deflector, the bellows does not necessarily have to be mounted immediately adjacent the battery so long as it is effectively interposed in any hot air flow path that may bear on the battery. Thus, bellow insulators may be useful in applications where battery mounting devices make the use of insulating blankets more difficult.

From the foregoing, it can be seen that the thermal insulators of the subject invention, in contrast to passive insulators, are responsive to the heat demands of a battery. At lower temperatures, they provide little or no insulation of a battery. The battery, therefore, is able to absorb heat and warm to more favorable operating temperatures. At higher temperatures, however, the novel thermal insulators provide effective insulation for batteries from excessive temperatures. When underhood temperatures cool, the thermal insulators allow more rapid cooling than typical passive insulators.

Moreover, in addition to such performance advantages, it will be appreciated that the novel thermal insulators are much more easily fabricated and installed than are previously suggested systems which respond to the heat demands of a battery. The novel thermal insulators have no controls, fans, sensors, conduits, and the like. They are easily fabricated from relatively inexpensive materials, and they may be fabricated in a variety of configurations as the insulating needs of a particular application may require.

The invention is further described by reference to the following example. It is not intended to limit the scope of the invention; rather, it is presented merely to facilitate the practice of the invention by those of ordinary skill in the art and to further disclose the inventor's best mode of doing so.

EXAMPLE 1

Thermal insulators in accordance with the subject invention were fabricated from high density polypropylene film having a thickness of about 0.5 mils. The insulators were fabricated from two sheets of film as a blanket generally as shown in FIGS. 1–3 by heat sealing the edges of the film together except that the blankets were formed with a single chamber defined by appropriate folds. Two larger blankets were fabricated having approximate dimensions, in their expanded state, of 11"×6"×½". Two smaller blankets were fabricated having approximate dimensions, in their expanded state, of 7"×6"×½". The chambers in each blanket were filled with approximately 3.4 g (large blankets) and 2.15 g (small blankets) of Freon 113 having a vaporization temperature of approximately 117° F. In their unexpanded state, the blankets had a thickness of approximately 5 mil, as compared to the ½" average thickness in their expanded state.

Two group 65 batteries were tested. The thermal insulators described above were secured to one battery by double-sided tape such that all four sides of the battery were covered. The top and bottom of the insulated battery were not covered. The other battery was completely uninsulated.

The batteries were cooled to 0° F. in an environmental chamber. The ambient air temperature in the chamber thereafter was raised to approximately 105°–110° F. to simulate the warmup process of batteries at low temperatures, and the temperature of the batteries was recorded over the next nine hours.

At the end of the nine hour warmup period, the temperature of the batteries was approaching the ambient temperature. Moreover, the rate of temperature rise during that period was observed to be substantially the same for both the insulated and uninsulated battery.

Thereafter, the ambient air temperature in the chamber was raised to approximately 184° F. to simulate high temperature operating conditions. The temperature of the batteries was monitored over the next fifteen hours. During that time, it was observed that the battery without insulation heated up to the ambient temperature in approximately 7 to 8 hours. The battery with the novel thermal insulators, however, did not approach the ambient temperature until near the end of the fifteen hour period. Moreover, within a short time after being exposed to high temperatures, a temperature gap of from about 10 to about 17° F. developed between the two batteries. That is, as the battery without insulation heated up to ambient temperatures, the battery with insulation was observed to have significantly lower temperatures.

The ambient air temperature then was dropped to 80° F. to simulate the cooldown period which takes place after a vehicle is parked, and the temperatures of the batteries was monitored over the next 24 hours. The cooling rates for both batteries was observed to be substantially the same.

Figure 5:
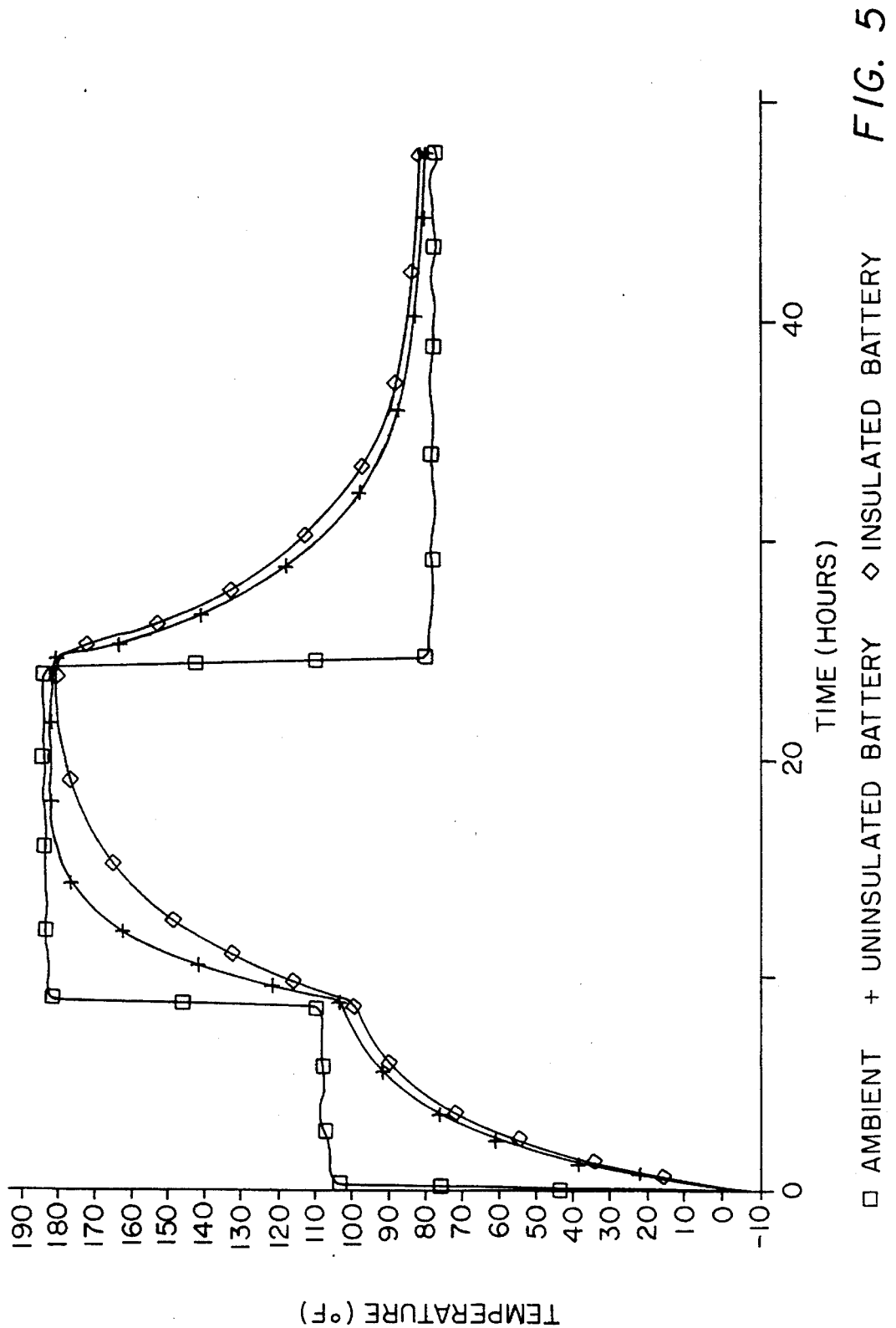
FIG. 5 is a graph of temperature as a function of time showing the improved insulating properties provided by novel thermal insulators as described in Example 1.

The temperature data described above is graphically illustrated in FIG. 5. It will be appreciated therefrom that the novel insulators do not significantly slow down the warmup or cooldown of batteries. On the other hand, at high temperatures, the novel insulators significantly reduce a batteries rate of temperature rise.

While this invention has been disclosed primarily in terms of specific embodiments thereof, it is not intended to be limited thereto. For example, batteries used with solar energy collectors also may be exposed to high temperatures. The thermal insulators of the subject invention can be adapted for such applications and for other applications where batteries are exposed to high temperatures which can affect their performance or service life. Other modifications and embodiments will be apparent to the worker in the art.

I claim:

1. A lead-acid SLI battery comprising a container having a top wall, a bottom wall, and side walls, and a temperature-sensitive thermal insulator fabricated from barrier film and having one or more expandable chambers containing a fluid, the fluid having a vaporization temperature of from about 90° F. to about 200° F., the insulator having a first volume above said vaporization temperature which is greater than a second volume of the insulator below said vaporization temperature, wherein the insulator is secured over at least a portion of the outer surfaces of the container walls.

2. The lead-acid SLI battery of claim 1, wherein the vaporization temperature is from about 100° F. to about 130° F.

3. The lead-acid SLI battery of claim 1, wherein the insulator comprises at least two layers of a barrier film, the chambers being defined between the barrier film layers which are sealed together.

4. The lead-acid SLI battery of claim 1, wherein the insulator is a blanket having a first thickness above the vaporization temperature which is greater than a second thickness below the vaporization temperature.

5. The lead-acid SLI battery of claim 1, wherein the insulator is a bellows having a first length above the vaporization temperature which is greater than a second length below the vaporization temperature.

6. The lead-acid SLI battery of claim 1, wherein the barrier film is a film composed of a member selected from the group consisting of polyolefin, rubber, polystyrene, polyester, polyvinylchloride, polyacrylonitrile, poly (vinylacetate), polyethylene terephthalate, poly (acrylonitrile styrene) polyacrylate, poly (vinylidene fluoride), polyurethane, polycarbonates, polyoxyphenylene, polybutadiene, and copolymers thereof.

7. The lead-acid SLI battery of claim 1, wherein the barrier film is a composite film.

8. The lead-acid SLI battery of claim 7, wherein the composite film includes a metallic film.

9. The lead-acid SLI battery of claim 1, wherein the fluid is a member selected from the group consisting of acetone, carbon disulfide, chloroform, dichloroethylene, diethylamine, diethylether, trimethyleneglycol, trimethylstyrene, dimethylbutane, dimethylsulfide, hexane, propylene, ethylbromide, ethylformate, ethylmercaptan, ethylpropylether, methylacetate, methylalcohol, methyliodide, methylpropionate, n-pentane, isopropyl alcohol, propylamine, propylformate, 1,1,2-trichloro-1,2,2-trifluoroethane, carbon tetrachloride, cyclohexane, 2,6-xylidine, 2,4-xylidine, 2,4-xyaldehyde, 4-vinylphenetol, 4-vinylanisole, 3-vinylanisole, 2-vinylanisole, 7-valerolacetone, iso-valeric acid, n-valeric acid, undecan-2-ol, undecane, trimethylsuccinic anhydride, trimethylethylbenzene, dichloroethane, and mixtures thereof.

10. The lead-acid SLI battery of claim 4, wherein the insulator covers the outer surfaces of the container side walls.

11. The lead-acid SLI battery of claim 4, wherein the insulator is mounted to the battery by double-sided tape.

* * * * *

UNITED STATES PATENT AND TRADEMARK OFFICE
CERTIFICATE OF CORRECTION

PATENT NO. : 5,516,600
DATED : May 14, 1996
INVENTOR(S) : Cherng

It is certified that error appears in the above-identified patent and that said Letters Patent is hereby corrected as shown below:

ON THE TITLE PAGE:

item [56] REFERENCES CITED:

5,082,075  1/1992  Karolek should read
--5,082,075  1/1992  Karolek et al.--.

Column 3, line 45, "FIG. 1 and 2" should read -- FIGS. 1 and 2 --.

Column 4, line 66, "ethyl formate" should read -- ethylformate--.

Column 10, line 28, "7-valerolacetone" should read -- γ-valerolacetone--.

Signed and Sealed this

Thirty-first Day of December, 1996

*Attest:*

BRUCE LEHMAN

*Attesting Officer*   *Commissioner of Patents and Trademarks*